United States Patent [19]

Keldany et al.

[11] Patent Number: 4,897,911

[45] Date of Patent: Feb. 6, 1990

[54] METHOD OF PLACING PLASTIC TUBES INTO EXISTING OPENINGS

[76] Inventors: Rachid Keldany, IM Aeglisten 3, CH-8124 Maur; Keith J. Shaw, Rainstrasse 50, CH-8804 Pfäffikon, both of Switzerland

[21] Appl. No.: 187,266

[22] Filed: Apr. 28, 1988

[30] Foreign Application Priority Data

Apr. 28, 1987 [CH] Switzerland .................. 1605/87

[51] Int. Cl.⁴ .................. B21D 39/03; B23P 11/00
[52] U.S. Cl. .................. 29/429; 29/458; 29/33 D; 29/33 K; 138/97; 156/294; 156/391; 156/195; 405/150; 405/184
[58] Field of Search .......... 29/460, 458, 33 K, 33 D, 29/429; 405/150, 184; 254/134.3 FT; 138/97; 156/294, 293, 71, 191, 391, 195

[56] References Cited

U.S. PATENT DOCUMENTS

| | | | |
|---|---|---|---|
| 3,240,645 | 3/1966 | Friedwald et al. | 156/195 |
| 4,009,063 | 2/1977 | Wood | 156/294 X |
| 4,135,958 | 1/1979 | Wood | 405/150 X |
| 4,182,262 | 1/1980 | Everson et al. | 156/294 X |
| 4,368,091 | 1/1983 | Ontsuga et al. | 156/294 X |
| 4,386,628 | 6/1983 | Stanley | 138/97 |
| 4,394,202 | 7/1983 | Thomas et al. | 138/97 X |
| 4,613,389 | 9/1986 | Tanaka | 156/195 X |
| 4,754,781 | 7/1988 | Putter | 138/97 X |

*Primary Examiner*—Charlie T. Moon
*Attorney, Agent, or Firm*—Laurence R. Brown; Alfred J. Mangels

[57] ABSTRACT

In the method for placing a plastic tube having a predetermined inherent stiffness into existing openings or through-passages a hardenable material, usually a hardenable synthetic resin, is applied onto the wall of the tube before placing the latter into the opening or through-passage. This hardenable material hardens completely only after a certain time period, i.e. after the tube has been brought into its desired position, to thereby increase the original inherent stiffness of the plastic tube. The device for carrying out the method includes apparatus for applying the stiffening material onto the wall surface of the tube.

10 Claims, 2 Drawing Sheets

METHOD OF PLACING PLASTIC TUBES INTO EXISTING OPENINGS

BACKGROUND OF THE INVENTION

1. Field of the Invention

The present invention relates to a method for placing plastic tubes into existing openings and through-passages, particularly into buried tube shaped through-passages or into existing pipe lines which have to be renovated, as well as to an apparatus for carrying out the method.

2. Description of the Prior Art

An actual technique for lining through-passages or openings in the ground with a plastic tube or to renovate existing pipe lines of various diameters by means of tubular plastic inserts consists in that such plastic tubes are placed in said openings or through-passages by either pulling or pushing the tubes into the desired position. In a particularly suitable process the plastic tube to be placed in such a through-passage is produced in situ, e.g. the tube is manufactured by a known winding process starting from plastic band material. The winding machine necessary for such a procedure is very often placed in the shaft or manhole on the hight or level of the through-passage. The plastic tube is wound up by said machine (winding cylinder) and simultaneously fed into said through-passage.

Independently of the technique of manufacturing said plastic tube and of inserting it into the through-passages, the tube should not be too stiff or rigid, this at least for the case where it has to be introduced into a through-passage which does not follow a straight line. It is practically impossible to insert and particularly to insert by pushing a tube into a curved through-passage except when using tubes of relatively flexible material and furthermore pulling the tubes into the through-passage. However, such tubes have often the disadvantage, once in the desired position, to have a stiffness which is fully insufficient in view of the loads appearing at such locations.

Attempts have been made to obviate this disadvantage by complicated mechanical devices (spring tensioning mechanism). However, the result was not very encouraging compared with the very high costs.

SUMMARY OF THE INVENTION

It is therefore an object of the present invention to provide a method which permits on the one hand to insert plastic tubes with a relatively low stiffness and, on the other hand, to increase the stiffness of the plastic tube to any desired value once the tube has been placed in the through-passage.

This process consists, according to the invention, in the steps of applying onto the wall of a plastic tube having a predetermined stiffness a hardenable stiffening material and, thereafter but before the setting of the stiffening material, placing the thus prepared tube into the desired position in said opening or through-passage, to thereby impart to said tube in its final position by the setting of the stiffening material a stiffness substantially increased when compared with its original inherent stiffness.

This process permits to insert into an opening or through-passage a plastic tube having any desired flexibility. The stiffness of the tube is increased only after a certain period of time, e.g. after the time needed for hardening or setting the stiffening material applied to the tube before being inserted.

In a preferred embodiment the stiffening material is applied onto the outer wall surface of the tube.

A particularly suitable stiffening material is a polymerizable plastic material which may contain reinforcement inserts, such as epoxy resins which will set after a predetermined time period by addition of a hardening catalyst. Other suitable materials are polyester resin or a polymethyl methacrylate modified polyester resin.

It may also be useful to use a stiffening material which will start to polymerize only under the influence of heat or electromagnetic waves (light).

It would be possible to first apply the stiffening material, e.g. the resin onto a carrier material, for example a strip of flexible material, glass fibers or the like. Such an impregnated carrier is thereafter wound onto the wall of the tube to be stiffened. It is also possible that the plastic stiffening material will enter in mechanical or chemical interconnection with the material of the plastic tube.

If the stiffening material is first applied onto a carrier, the preimpregnated carrier after having been wound onto the tube is preferably wetted with a hardening catalyst.

The plastic tubes as used may be provided with outer circular or helical ribs. In this case the stiffening material will be applied into the interspaces between said ribs.

It is to be understood that the stiffening material may be applied to the tube during the insertion of the latter into said opening or through-passage (onto those portions of the tube which are still outside said through-passage). This is particularly practiced where the plastic tube is manufactured in situ, i.e. directly in front of the opening into which the tube has to be inserted.

In a very particular embodiment of the invention the plastic tube to be stiffened is made of a light-transmitting material. This allows to use a stiffening material which will harden under the influence of light, such light being supplied after placing the tube in the final position by means of a light source being passed through the tube, e.g. by means of a UV-light source.

It is of course preferable that the hardenable stiffening material is a material which is not miscible with water and not displaceable by water.

A further object of the invention is to provide an apparatus for carrying out the method, comprising means or applying a hardenable stiffening material onto the wall of a prefabricated plastic tube.

It may be particularly useful to use such an apparatus having a stock container or reservoir filled with liquid or plastic hardenable material as well as means for conducting at least one carrier strip for the hardenable material through said container in order to impregnate the carrier with this material, as well as means for winding the carrier strip impregnated with hardenable material onto the wall surface of the plastic tube.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

As already mentioned herein-above the method according to the invention serves to place a plastic tube into an existing opening or through-passage, e.g. into an existing pipe line to be renovated, with-particular steps enabling to increase the inherent stiffness of the tube to predetermined values after having placed the tube into its desired final position in said through-passage.

This is achieved by applying a hardenable stiffening material, e.g. a stiffening material which will harden only after a predetermined period of time, all to the wall of the tube, usually onto the outer wall of the tube immediately before the tube is placed by pulling or pushing into the through-passage (existing pipe line to be renovated, buried channel or tube etc.).

The stiffening material may be applied to the tube in the form of a full coating or it may be-applied along predetermined paths. This is preferably made in that a strip shaped carrier material (textile strip, a web of glass fibers or the like) is coated or impregnated with a hardenable synthetic resin before being wound onto the outer wall of the tube (preferably into the interspaces between circular qr helical outer ribs). The synthetic resin will then bond to the material of the tube and harden, whereby the time of hardening will depend from the stiffening material is used or the hardening catalyst added to the stiffening material (type and quantity of the catalyst).

Particularly useful stiffening materials are epoxy resins (ethoxy resins, epoxy resins such as araldite). These resins after polymerization by means of catalysts (e.g. amino catalysts) will form a tension free plastic body with great hardness and resistance to impact and they will stiffen the tube in the desired manner.

Figure 1:
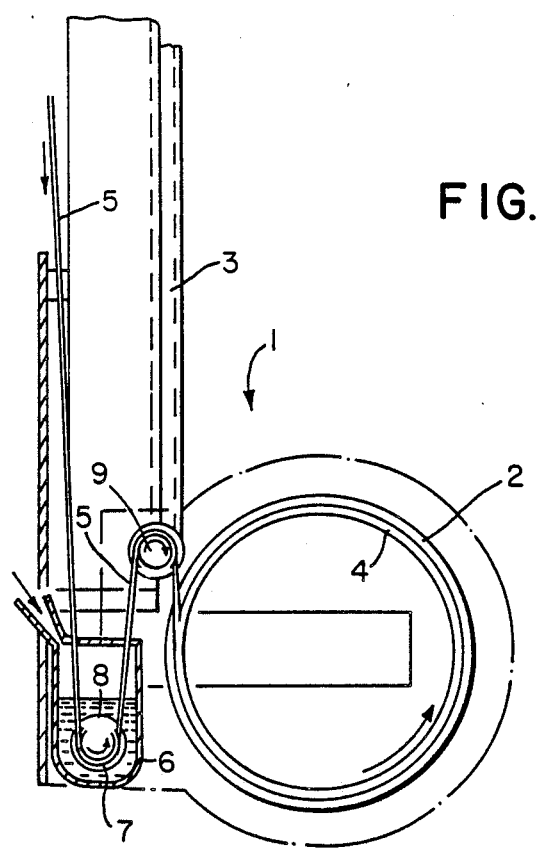
FIG. 1 is a purely schematical vertical section through a winding device for a plastic tube with additionally an apparatus for applying hardenable stiffening material onto the outer wall of the wound tube.
Figure 2:
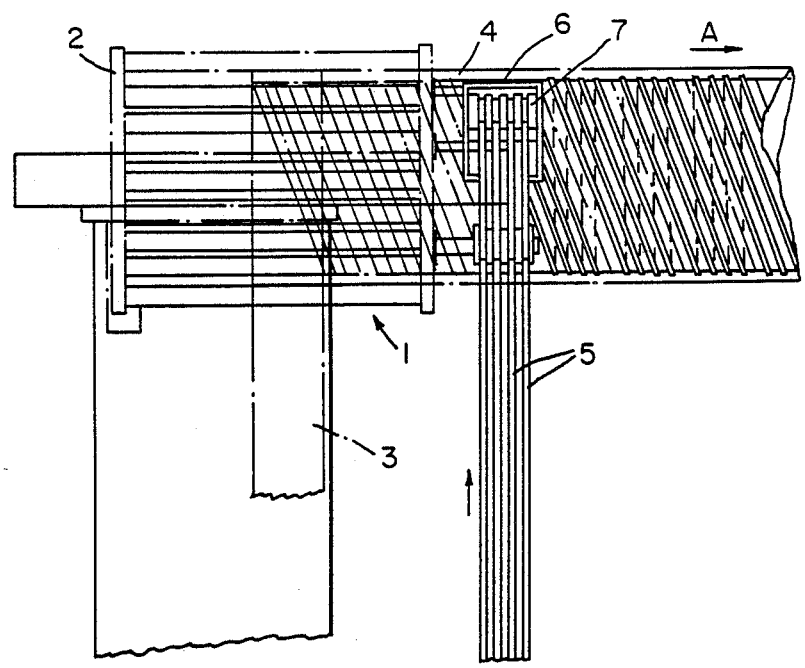
FIG. 2 is a schematical top view of the device shown in FIG. 1.

The drawings (FIGS. 1 and 2) illustrate a device for winding a plastic tube 1, in which on the inner wall of a winding cylinder 2 a band 3 of plastic material (optionally provided with outer ribs) is spirally or helically wound to form a plastic tube 4 (by interconnecting adjoining side edges of the band purely mechanically or by bonding or welding these side edges). The tube 4 such formed will be pushed by the drive of the machine out of the cylinder 2 and advanced in the direction of arrow A (usually directly into the pipe line to be lined with the wound tube, not represented here).

Immediately after the exit of the cylinder 2 band material 5 coated or impregnated with hardenable stiffening material is wound onto the outer wall of the tube (preferably into the interspaces between the circular or helical ribs) To this end the bands or strips 5 are conducted through a container or reservoir 6 containing liquid stiffening material 7, coated or impregnated with such stiffening material and fed over rollers 8,9 onto the outer wall of the tube and applied against this wall. In the example illustrated in the drawing four carrier strips 5 are used simultaneously. By means of the tube 4 rotating about its own longitudinal axis the carrier strips are automatically drawn off in the direction of the arrow and applied onto the outer wall of the tube. The tube onto which the stiffening material has been applied is then brought into the desired position where the stiffening material finally will harden and will increase the inherent stiffness of the original tube.

It would in principle be possible to apply the stiffening material onto the wall of the tube by spraying where it would stick in the form of a hardenable coating, bond to the material of the tube and finally harden.

As already mentioned the material forming the plastic tube could be a light-transmitting material. This allows to use a stiffening material hardening under the influence of light. Hardening or setting of the material could in this case be initiated by a light source which will pass through the interior of the tube.

While there are shown and described present preferred embodiments of the invention, it is to be distinctly understood that the invention is not limited thereto, but may otherwise variously be embodied and practiced within the scope of the following claims.

We claim:

1. A method for increasing the stiffness of flexible plastic tubes after they are inserted into existing through-passages or into existing pipe lines, comprising the following steps: at an entrance to a through-passage, continuously forming a spirally wound tube from a band of plastic material with side edges of the band in abutting relationship, the wound tube being flexible and having an initial stiffness; simultaneously pushing the wound tube into the through-passage as it is being formed; applying a hardenable stiffening material onto the outer wall surface of the wound tube as it is being formed and thereafter, but before the setting of the stiffening material, positioning the wound tube with applied stiffening material at a desired position within said through-passage; and permitting the stiffening material to set to thereby impart to said wound tube after it is in its desired position in the through-passage a stiffness increase by the setting of the stiffening material when compared with its initial stiffness.

2. The method of claim 1, wherein said hardenable stiffening material is a polymerizable plastic material, optionally containing reinforcement inserts, such as for example epoxy or polyester resin or a polymethyl methacrylate modified polyester resin.

3. The method of claim 2, wherein polymerization of the stiffening material is initiated only after said tube has been placed into the desired position in said opening or through-passage and is initiated by applying at least one of heat, electromagnetic waves, such as light, ray energy, and catalysts.

4. The method of claim 1, wherein said hardenable stiffening material is first applied onto a support or carrier material, followed by winding the carrier material onto the wall of the tube.

5. The method of claim 1, wherein said plastic tube has outer ribs, said stiffening material being applied into interspaces between said ribs.

6. The method of claim 5, wherein said carrier material impregnated with hardenable stiffening material is applied in a spirally extending path onto the wall of the tube.

7. The method of claim 1, wherein said hardenable stiffening material is applied onto the tube wall portion which is still outside of the through-passage during the introduction of the tube into its position within said through-passage.

8. The method of claim 1, wherein the material used for forming said plastic tube is a light-transmitting plastic material and said stiffening material is a material hardenable under the influence of light rays, said stiffening material being hardened after the tube has been placed in a desired final position by passing light from a light source through the tube.

9. The method of claim 4, wherein said carrier is preimpregnated with stiffening material, wound onto the tube and finally wetted with a hardening catalyst.

10. The method of claim 1, wherein said hardenable stiffening material is a material which is not miscible nor displaceable with water.

* * * * *